United States Patent
Kim et al.

(10) Patent No.: US 10,071,818 B2
(45) Date of Patent: Sep. 11, 2018

(54) SYSTEMS AND METHODS FOR PROVIDING AIRPLANE PERFORMANCE CALCULATIONS

(71) Applicant: The Boeing Company, Chicago, IL (US)

(72) Inventors: Geun Il Kim, Bellevue, WA (US); Roy S. Alcantara, Seattle, WA (US); Christie M. Maldonado, Mukilteo, WA (US); Steven J. Moskalik, Seattle, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/995,115

(22) Filed: Jan. 13, 2016

(65) Prior Publication Data

US 2017/0197727 A1    Jul. 13, 2017

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64D 45/00* | (2006.01) |
| *B64D 37/00* | (2006.01) |
| *G06F 17/30* | (2006.01) |
| *G07C 5/08* | (2006.01) |
| *G06F 7/70* | (2006.01) |

(Continued)

(52) U.S. Cl.
CPC ............ *B64D 45/00* (2013.01); *B64D 37/00* (2013.01); *G06F 17/30345* (2013.01); *G07C 5/085* (2013.01); *G07C 5/0808* (2013.01)

(58) Field of Classification Search
CPC .............................. B64D 45/00; B64D 37/00
USPC ....................................................... 701/3, 14
See application file for complete search history.

(56) References Cited

U.S. PATENT DOCUMENTS

| | | | |
|---|---|---|---|
| 6,134,500 | A | 10/2000 | Tang et al. |
| 7,739,004 | B2 | 6/2010 | Johnson |

(Continued)

FOREIGN PATENT DOCUMENTS

| | | | |
|---|---|---|---|
| EP | 0236587 | A2 | 9/1987 |
| EP | 0250140 | A2 | 12/1987 |

(Continued)

OTHER PUBLICATIONS

Extended European Search Report dated Mar. 24, 2017 in European Patent Application No. 17151141.3 (European counterpart of the instant U.S. patent Application).

*Primary Examiner* — Mahmoud S Ismail
(74) *Attorney, Agent, or Firm* — Ostrager Chong Flaherty & Broitman P.C.

(57) ABSTRACT

A flight management system which is capable of monitoring changes in airplane characteristics such as fuel flow and drag. When a predetermined event is triggered, the flight management system (FMS) creates or updates a set of "dynamic" tables in a database which enable FMS performance algorithms to utilize the latest fuel flow and drag data. Using the updated aerodynamic and propulsion performance data in the dynamic tables, the flight management system is able to compute more accurate flight profile and trip prediction parameters such as estimated time of arrival and predicted fuel consumption quantity.

16 Claims, 8 Drawing Sheets

(51) Int. Cl.
*G06F 19/00* (2018.01)
*G06G 7/00* (2006.01)
*G06G 7/76* (2006.01)

(56) References Cited

U.S. PATENT DOCUMENTS

| | | | |
|---|---|---|---|
| 2008/0249675 A1* | 10/2008 | Goodman | B64C 25/426 |
| | | | 701/16 |
| 2008/0300738 A1 | 12/2008 | Coulmeau et al. | |
| 2010/0076672 A1 | 3/2010 | Cremers | |
| 2011/0208374 A1 | 8/2011 | Jayathirtha et al. | |
| 2013/0046422 A1* | 2/2013 | Cabos | G08G 5/0034 |
| | | | 701/3 |
| 2013/0325219 A1* | 12/2013 | Pitard | G07C 5/0825 |
| | | | 701/14 |

FOREIGN PATENT DOCUMENTS

| | | |
|---|---|---|
| EP | 2685292 A2 | 1/2014 |
| WO | 2015196259 A1 | 12/2015 |

\* cited by examiner

DATA FOR MODEL X
DRAG CORRECTION FACTOR
ACCURACY = +- 0.1
INPUT #1 = MACH
0.500  0.600  0.700  0.800
INPUT #2 = ALTITUDE
10000  20000  30000  40000
OUTPUT = DRAG CORRECTION FACTOR
0.05  0.10  0.15  0.20
0.25  0.30  0.35  0.40
0.45  0.50  0.55  0.60
0.65  0.70  0.75  0.80

FIG. 6

DATA FOR MODEL X
LONG RANGE CRUISE (LRC) MACH NUMBER
ACCURACY = +- 0.1 MACH
Input #1 = GROSS WEIGHT/DELTA
  00000.   10000.   20000.   30000.   40000.
  50000.   60000.   70000.   80000.
Output = LONG RANGE MACH NUMBER
  0.1   0.2   0.3   0.4   0.5
  0.6   0.7   0.8   0.9

FIG. 7

```
DATA FOR MODEL X
DYNAMIC LONG RANGE CRUISE (LRC) MACH NUMBER
ACCURACY = +- 0.1 MACH
Input #1 = TEMP DEVIATION FROM STD DAY (C)
   -10.0    -5.0    0.0    5.0    10.0
Input #2 = GROSS WEIGHT (KLBS)
   000.    100.    200.    300.    400.
Output = DYNAMIC LONG RANGE MACH NUMBER
   0.00    0.05    0.10    0.15    0.20
   0.05    0.10    0.15    0.20    0.25
   0.10    0.15    0.20    0.25    0.30
   ...
   0.70    0.75    0.80    0.85    0.90
```

⤷ 54

```
<Table>
<Header> DATA for MODEL X</Header>
<Name> DYNAMIC LONG RANGE CRUISE (LRC) MACH NUMBER</Name>
<Accuracy>+- 0.1 MACH</Accuracy>
<Input>
   <data>--10.0</data>
   <data>-5.0</data>
   <data>--0.0</data>
   ...
   <data>10.0</data>
</Input>
<Input>
   <data>000.</data>
   <data>100</data>
   <data>200</data>
   ...
   <data>400</data>
</Input>
<Output>
  <Group>
   <data>0.00</data>
   <data>0.05</data>
   <data>0.10</data>
   ...
   <data>0.20</data>
   </Group>
   <Group>
   <data>0.05</data>
   <data>0.10</data>
   <data>0.15</data>
   ...
   <data>0.25</data>
   </Group>
   <Group>
   <data>0.70</data>
   <data>0.75</data>
   <data>0.80</data>
   ...
   <data>0.90</data>
   </Group>
</Output>
</Table>
```
56

FIG. 10

SYSTEMS AND METHODS FOR PROVIDING AIRPLANE PERFORMANCE CALCULATIONS

BACKGROUND

The technology disclosed herein generally relates to flight management systems for airplanes and, more particularly, relates to techniques for computing predicted flight profile and associated trip prediction parameters in a flight management system.

A flight management system (FMS) installed in the flight deck of a modern airplane performs various flight critical functions such as navigation, guidance, flight planning, datalink and performance. For the performance function, the flight management system has various internal algorithms that utilize aerodynamic and propulsion performance data (hereinafter "baseline performance data") stored in a baseline performance database to compute predicted flight profile and the associated trip prediction parameters such as estimated time of arrival and predicted fuel consumption quantity. However, the airplane characteristics may vary over time due to small but incremental changes to the airplane aerodynamic and propulsion performance. As a result, the FMS performance algorithms and the baseline performance data may deviate from the actual airplane performance over time as the airplane continues to operate in service. This results in the flight management system computing inaccurate trip prediction Due to the variability of some airplane characteristics, some airlines may take one or more of the following steps: (1) download and analyze recorded real-time flight data such as fuel flow, speed, altitude, etc. after each flight; (2) try to understand the actual performance and behavior of individual airplane to gain efficiency, detect anomalies and reduce operating costs; and (3) compute fuel flow or drag corrections based on the analysis of the historical flight data and apply those corrections to the baseline FMS performance data by entering them into the flight management system manually as a maintenance task. A most efficient way could be to load a set of correction data tables into the flight management system via datalink and/or as supplemental databases. In the latter case, a new database may need to be created and uploaded to the flight management system as often as needed (weekly or monthly basis). This would entail the expenditure of significant time and effort to update and recertify the new database and/or the flight management system.

Even if the changes to airplane characteristics such as fuel flow and drag were loaded into the flight management system, many FMS performance algorithms would continue to utilize data tables in the baseline performance data, whose values have already been preprocessed using the baseline airplane performance data and are not affected by the corrections loaded to the flight management system, for one or more of the following reasons: (1) due to significant time and effort required to update and recertify the baseline performance data tables, those tables are not modifiable within the flight management system and the airplane continues its operation with the initial certified data that was installed when the airplane was first delivered; (2) even when the updated airplane characteristics data such as fuel flow and drag are available, the flight management system cannot constantly access them to compute the performance parameters due to limited FMS computing power and/or strict FMS timing requirements; and (3) the inputs and outputs of the baseline performance data tables may not be compatible with the updated airplane characteristics data, such as fuel flow and drag.

It would be advantageous to provide a flight management system that is configured to efficiently provide real-time airplane performance calculations for use in computing predicted flight profile and associated trip prediction parameters.

SUMMARY

The subject matter disclosed in detail below is directed to a flight management system which is capable of monitoring changes in airplane characteristics such as fuel flow and drag. When a predetermined event is triggered, the flight management system creates or updates a set of "dynamic" tables in a database which enable FMS performance algorithms to utilize the latest fuel flow and drag data. Using the updated aerodynamic and propulsion performance data in the dynamic tables, the flight management system is able to compute more accurate flight profile and trip prediction parameters, such as estimated time of arrival and predicted fuel consumption quantity.

The systems and methods disclosed in detail below create and update airplane performance data dynamically based on defined triggers, efficient algorithms and data storage to better utilize computing resources in the flight management system.

In accordance with some embodiments, when fuel flow or drag corrections are uploaded and applied to the baseline airplane performance data (or a supplemental database), that triggers an applicable FMS performance algorithm to compute or update a set of dynamic tables in the flight management system based on the fuel flow and drag correction data. The incorporation of this capability has the benefit that the FMS performance algorithms would then reflect the up-to-date (i.e., current) airplane characteristics. Also, this capability makes manual updating and recertifying of the performance data tables in the baseline performance database unnecessary.

When a set of dynamic data tables are created or updated, their values are stored in a table format (having two or more dimensions) so that the values can be looked up and used in an efficient manner by the flight management system for performance computations such as trip prediction. The storing of dynamic data tables benefits the flight management system by avoiding constant use of the corrected fuel flow or drag data to compute updated values for the FMS performance algorithms. The corrected airplane performance values can simply be looked up in the dynamic tables, thus freeing up the FMS computing resources. This is also computationally efficient.

The dynamic table input/output definition can be defined in different ways within the flight management system. For instance, it can be contained within other loadable databases, or as part of other existing baseline performance database tables. The dynamic data tables with the updated data for the performance functions can be offloaded outside of the flight management system to other systems via physical or wireless connections and can be made available for further analysis.

In accordance with some embodiments, the flight management system can be configured (i.e., programmed) to populate the dynamic data table with new values in response to a predetermined trigger point/event, such as certain crew actions or a determination that the deviation of a corrected airplane characteristic value from a current airplane characteristic value is equal to or greater than a specified threshold percentage. In accordance with other embodiments, the dynamic data tables can be populated at regular intervals of time or before every flight.

Furthermore, when the FMS performance algorithms use the dynamic data tables instead of the tables in the baseline performance database, this could be indicated to the pilot by various visual indications on the CDU pages or on the flight deck displays.

One aspect of the subject matter disclosed in detail below is a method for displaying a predicted value of a trip parameter onboard an airplane, comprising: (a) storing a baseline airplane performance data table in a first non-transitory tangible computer-readable medium, the baseline airplane performance data table comprising a first lookup table having inputs which are values of flight parameters and having outputs which are predicted values of a trip parameter, which trip parameter values are functions of baseline values of an airplane characteristic and the values of the flight parameters; (b) obtaining airplane characteristic correction data representing corrections to be applied to the baseline values of the airplane characteristic of the airplane; (c) computing corrected values of the airplane characteristic by applying the corrections to the baseline values of the airplane characteristic of the airplane; (d) generating a dynamic airplane performance data table comprising a second lookup table having inputs which are values of the flight parameters and having outputs which are updated predicted values of the trip parameter, which trip parameter values are functions of the corrected values of the airplane characteristic and the values of the flight parameters; (e) storing the dynamic airplane performance data table in a second non-transitory tangible computer-readable medium; (f) retrieving an updated predicted value of the trip parameter from the dynamic airplane performance data table during a current flight of the airplane; and (g) displaying alphanumeric symbology representing the retrieved updated predicted value on a display unit in the flight deck during the current flight of the airplane.

The foregoing method may further comprise: measuring a physical embodiment of the airplane characteristic onboard the airplane to produce a real-time measured value of the airplane characteristic; determining a magnitude of a deviation of the real-time measured value of the airplane characteristic from a corresponding one of the corrected values of the airplane characteristic; comparing the magnitude of the deviation to a specified threshold; and repopulating the dynamic airplane performance data table based on the magnitude of the deviation in response to the magnitude of the deviation exceeding the specified threshold. In accordance with one embodiment, the airplane characteristic is fuel flow.

Another aspect of the subject matter disclosed in detail below is a method for displaying a predicted value of a trip parameter onboard an airplane, comprising: (a) storing values of an airplane characteristic in a non-transitory tangible computer-readable medium; (b) storing a dynamic airplane performance data table in the non-transitory tangible computer-readable medium, the dynamic airplane performance data table comprising a lookup table having inputs which are values of the flight parameters and having outputs which are updated predicted values of the trip parameter, which trip parameter values are functions of the values of the airplane characteristic and the values of the flight parameters; (c) measuring a physical embodiment of the airplane characteristic onboard the airplane to produce a real-time measured value of the airplane characteristic; (d) determining a magnitude of a deviation of the real-time measured value of the airplane characteristic from a corresponding one of the values of the airplane characteristic; (e) comparing the magnitude of the deviation to a specified threshold; (f) repopulating the dynamic airplane performance data table based on the magnitude of the deviation in response to the magnitude of the deviation exceeding the specified threshold; (e) retrieving an updated predicted value of the trip parameter from the repopulated dynamic airplane performance data table during a current flight of the airplane; and (f) displaying alphanumeric symbology representing the retrieved updated predicted value on a display unit in the flight deck during the current flight of the airplane. In accordance with one embodiment, the airplane characteristic is fuel flow.

A further aspect is a system for displaying a predicted value of a trip parameter onboard an airplane, comprising a display unit and a computer system configured to perform the following operations: (a) storing a baseline airplane performance data table in a first non-transitory tangible computer-readable medium, the baseline airplane performance data table comprising a first lookup table having inputs which are values of flight parameters and having outputs which are predicted values of a trip parameter, which trip parameter values are functions of baseline values of an airplane characteristic and the values of the flight parameters; (b) obtaining airplane characteristic correction data representing corrections to be applied to the baseline values of the airplane characteristic of the airplane; (c) computing corrected values of the airplane characteristic by applying the corrections to the baseline values of the airplane characteristic of the airplane; (d) generating a dynamic airplane performance data table comprising a second lookup table having inputs which are values of the flight parameters and having outputs which are updated predicted values of the trip parameter, which trip parameter values are functions of the corrected values of the airplane characteristic and the values of the flight parameters; (e) storing the dynamic airplane performance data table in a second non-transitory tangible computer-readable medium; (f) retrieving an updated predicted value of the trip parameter from the dynamic airplane performance data table during a current flight of the airplane; and (g) displaying alphanumeric symbology representing the retrieved updated predicted value on a display unit in the flight deck during the current flight of the airplane. The computer system may be further configured to perform the following operations: determining a magnitude of a deviation of a real-time measured value of the airplane characteristic from a corresponding one of the corrected values of the airplane characteristic; comparing the magnitude of the deviation to a specified threshold; and repopulating the dynamic airplane performance data table based on the magnitude of the deviation in response to the magnitude of the deviation exceeding the specified threshold.

Other aspects of systems and methods for computing predicted flight profile and associated trip prediction parameters are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 6 is a diagram representing a print-out of one example of a drag correction data table that can be loaded as digital data into a non-transitory tangible computer-readable storage medium via a datalink or using an onboard network system (ONS).

FIG. 7 is a diagram representing a print-out of one example of a data table that is may be stored as digital data in a non-transitory tangible computer-readable storage medium and used by an FMS performance algorithm (e.g., Long Range Cruise) in a typical flight management system.

FIG. 10 is a diagram representing a print-out of one example of a dynamically generated data table that is may be stored as digital data in XML format in a non-transitory tangible computer-readable storage medium and used by an FMS performance algorithm (e.g., Long Range Cruise) in an enhanced flight management system.

FIG. 11A shows a screenshot of a CDU page that is displayed when the flight management system is using a baseline airplane performance data table, such as an aero/engine database. FIG. 11B shows a screenshot of a changed CDU page that is displayed when the flight management system is using a dynamic airplane performance data table.

Reference will hereinafter be made to the drawings in which similar elements in different drawings bear the same reference numerals.

DETAILED DESCRIPTION

Illustrative embodiments of an improved avionics flight management system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
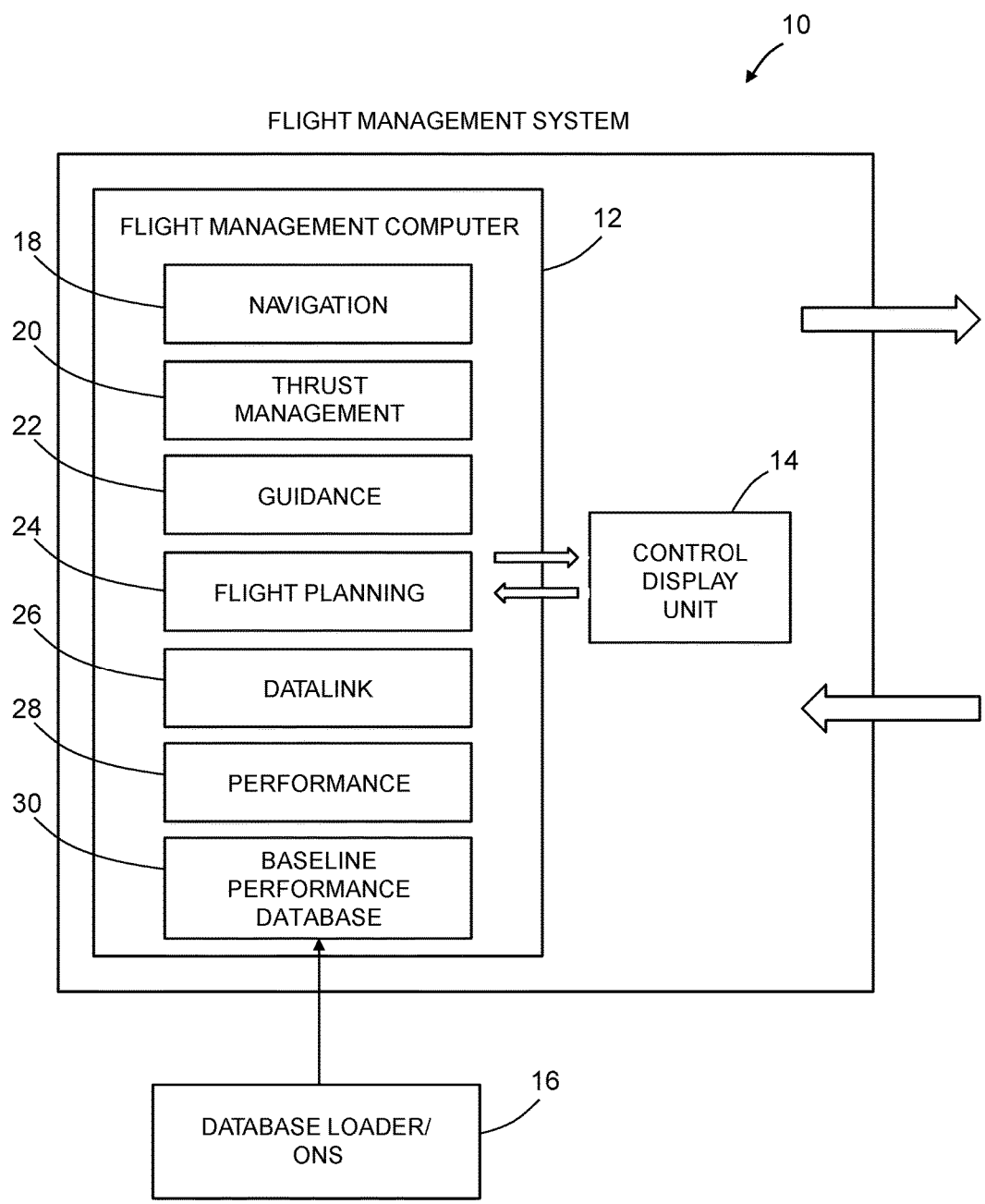
FIG. 1 is a block diagram showing an overall architecture of a typical flight management system.

FIG. 1 is a block diagram showing an overall architecture of a typical flight management system 10 of a type comprising one or more flight management computers 12 and one or more control display units (CDUs) 14. Only one control display unit 14 is depicted in FIG. 1. The CDUs are the primary interface between the flight management computer 12 and the pilots.

The FMC software may reside on respective core processors in respective airplane information management system (AIMS) cabinets. The FMC software may comprise the following: a flight management function, a navigation function 18, a thrust management function 20, and a baseline performance database 30 (for example, an aero/engine database containing aerodynamic and propulsion data). The flight management function provides guidance 22, flight planning 24, datalink 26, a performance management function 28, CDU interfaces, an interface to the base performance database 30, and other functionalities. The navigation function provides sensor selection (inertial, radio, satellite), position solution determination and other functionalities. The navigation function computes airplane position, velocity, track angle and other airplane parameters, collectively termed airplane states, to support FMCS functions such as flight planning, guidance, and display as well as AIMS—external functions.

The flight management system 10 integrates information from an air data and inertial reference system, navigation sensors, engine and fuel sensors, and other airplane systems (not shown in FIG. 1), along with internal databases and crew-entered data to perform the multiple functions. The flight management computer may contain a navigation database (not shown in FIG. 1) and the baseline performance database 30.

For the performance management function 28, the flight management system 10 has various internal algorithms that utilize aerodynamic and propulsion performance data stored in the baseline performance database 30 to compute predicted flight profile and the associated trip prediction parameters such as estimated time of arrival and predicted fuel consumption quantity. The performance management function 28 uses aerodynamic and propulsion models and optimization algorithms to generate a full flight regime vertical profile consistent with the performance mode selected and within flight plan constraints imposed by air traffic control. Inputs to the performance management function 28 include fuel flow, total fuel, flap position, engine data and limits, altitude, airspeed, Mach number, air temperature, vertical speed, progress along the flight plan and pilot inputs from the CDU. The outputs are target values of Mach number, calibrated airspeed and thrust for optimum control of the airplane, and advisory data to the crew.

Various performance modes for each flight phase, such as economy climb, economy cruise and long-range cruise, may be selected by the pilot through the CDU. Multiple performance modes may be specified for the cruise flight phase. The default mode is an economy profile with speed limited. Economy profiles are computed to optimize fuel or time costs as governed by a cost index factor.

The aerodynamic and propulsion models are used to generate an optimum vertical profile for the selected performance modes. If the autothrottle or autopilot is not engaged for automatic control of the performance management function 28, the pilot can manually fly the optimum speed schedule by referring to the CDU and to the airspeed bug on the speed tape.

In accordance with the embodiment depicted in FIG. 1, the baseline performance database 30 is loaded by a database loader 16 using an onboard network system (ONS). The baseline performance database 30 contains prestored data for the aerodynamic model of the airplane as well as for the engine performance model and thrust rating model of the engines. The baseline performance database 30 is used by the performance management function 28 to compute real-time parameters such as speed limits and speed targets, and to perform predictive computations such as flight plan predictions. The baseline performance database 30 is also used by the thrust management function 20 to compute thrust limits.

Figure 2:
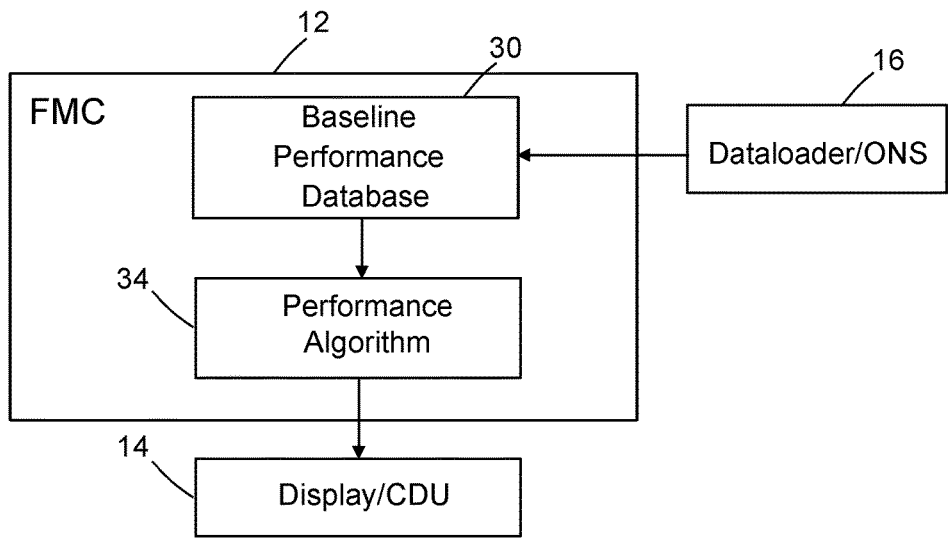
FIG. 2 is a block diagram identifying some components of the flight management system depicted in FIG. 1.

The performance management function 28 depicted in FIG. 1 can be configured to execute a performance algorithm that creates and updates airplane performance data dynamically based on defined triggers, thereby enabling better utilization of computing resources in the flight management system. As shown in FIG. 2, baseline performance data can be loaded into a baseline performance database 30 by means of the data loader 16. The performance algorithm 34 then retrieves pertinent baseline performance data from the baseline performance database 30 and uses it to compute a predicted trip parameter. The result of that computation is displayed on the control display unit 14 for viewing by the flight crew.

Figure 3:
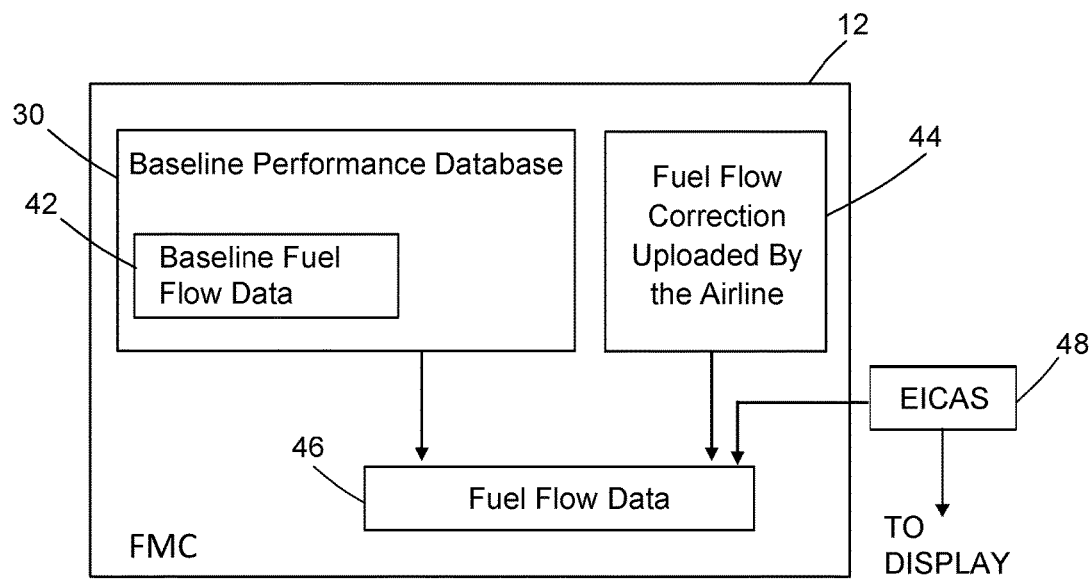
FIG. 3 is a block diagram identifying components of a subsystem for calculating fuel flow, which process is part of the performance management function depicted in FIG. 1.

FIG. 3 is a block diagram identifying components of a subsystem for calculating fuel flow, which process is part of the performance management function 28 depicted in FIG. 1. In the current FMC design, the fuel flow data is computed using both baseline fuel flow data 42 stored in the baseline performance database 30 and a fuel flow correction 44 updated/entered by the airline. The estimated current fuel flow value is computed using the fuel flow correction. The fuel flow correction can simply be a percentage number. For example, if it is 1%, then the baseline fuel flow data is changed by 1%.

Typically an airplane is also equipped with means for measuring the actual fuel flow in real time. The method comprises the step of obtaining a predicted fuel flow rate for each engine of the aircraft based on a set of predetermined reference operating parameters for each engine. Preferably, the predetermined reference operating parameters of the engine include engine thrust, airspeed, altitude, outside air temperature, engine accessory loads (such as electric generators, bleed air loads, hydraulic pump loads, and other loads), and engine age (number of cycles). The predetermined reference operating parameters for each engine may be obtained from a standard look-up table or quick reference handbook. The method further comprises the step of obtaining a measured fuel flow rate for each engine of the aircraft based on actual operating parameters for each engine. The measured fuel flow rate for each engine is obtained in several steps. A flow meter installed in the fuel line physically measures the volume of fuel traveling through the line. A fuel densitometer installed in the fuel tank computes the fuel density. Software multiplies the volumetric fuel flow rate by the fuel density to obtain a fuel mass flow rate which is displayed to the pilot. The method further comprises using an engine monitoring system software, such as the software used by the engine indication and crew alerting system (EICAS) 48 depicted in FIG. 3, to compare the predicted fuel flow rate to the measured fuel flow rate. The method further comprises the step of automatically providing an alert on control display unit 14 (see FIG. 1) if there is a difference above a nuisance threshold between the measured fuel flow rate and the predicted fuel flow rate. The predicted fuel flow rate is compared to the actual fuel flow at a certain engine thrust, altitude, and speed, and if the actual fuel flow rate is much higher than what is predicted, the message is flagged for that engine, and an alert is automatically displayed.

In accordance with the embodiments disclosed in detail below, an improved flight management system can be provided with the capability to monitor changes in airplane characteristics such as fuel flow and drag. A flight management computer can be configured so that when a predetermined event is triggered, the flight management computer creates or updates a set of dynamic airplane performance data tables which enable FMS performance algorithms to utilize the latest fuel flow and drag data. Using the updated aerodynamic and propulsion performance data in the dynamic tables, the flight management system is able to compute more accurate flight profile and trip prediction parameters such as estimated time of arrival and predicted fuel consumption quantity.

The dynamic table input/output definition can be defined within the flight management system or it can be contained within other loadable databases or in other existing data tables. The data tables with the updated data for the performance functions can be offloaded outside of the flight management system to other systems via physical or wireless connections and can be made available for further analysis.

Figure 4:
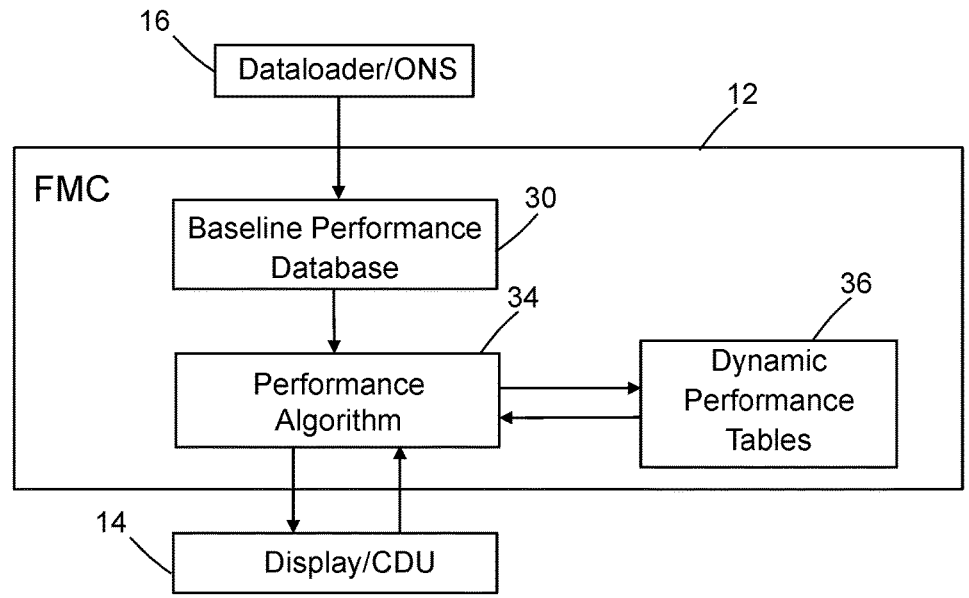
FIG. 4 is a block diagram identifying some components of a flight management system in accordance with one embodiment in which dynamic performance data tables are stored in the flight management computer.

FIG. 4 is a block diagram identifying some components of a flight management system in accordance with one embodiment in which dynamic airplane performance tables 36 reside within the flight management computer 12. As shown in FIG. 4, there are two-way communications between the performance algorithm 34 and the dynamic airplane performance tables 36. Data flows from the performance algorithm 34 to the dynamic airplane performance tables 36 when there is a trigger point that causes a processor of the flight management computer 12 to populate the dynamic airplane performance tables 36. Once the dynamic airplane performance tables 36 have been populated, they are used by the performance algorithm 34. Also there are two-way communications between the performance algorithm 34 and the control display unit 14. This is because the pilot now has a capability to use the baseline performance database 30 either alone or in conjunction with the dynamic airplane performance tables 36 for more accurate prediction computation.

Figure 5:
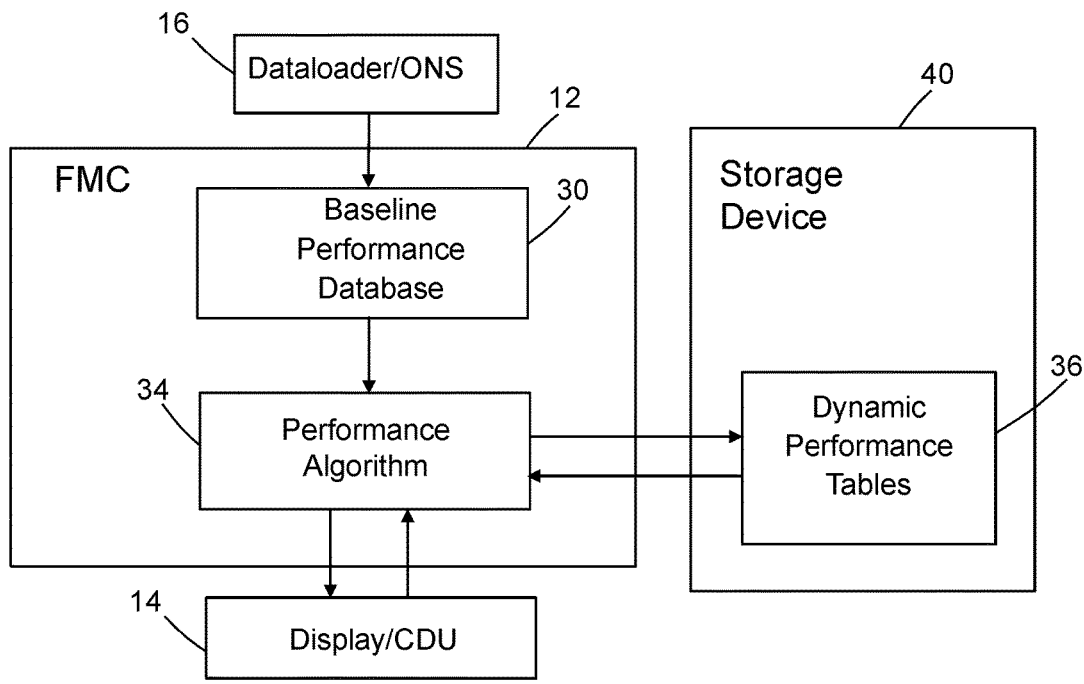
FIG. 5 is a block diagram identifying some components of a flight management system in which dynamic performance data tables are stored in a storage device separate from the flight management computer.

FIG. 5 is a block diagram identifying some components of a flight management system in which dynamic airplane performance tables 36 are stored in a storage device 40 separate from the flight management computer 12. In accordance with this design, the dynamic airplane performance tables 36 can be hosted on any other onboard systems (such as onboard network system, electronic flight bag, maintenance access terminal, etc.), on-ground system/server, hand-held devices or the cloud.

When the fuel flow or drag corrections are uploaded and applied to the baseline airplane performance data in the baseline performance database (or a supplemental database), that triggers an applicable FMS performance algorithm to compute or update a set of dynamic tables in the flight management system based on the new fuel flow and drag data. The FMS performance algorithms will now reflect the up-to-date (i.e., current) airplane characteristics. The flight management system does not have to constantly use the corrected fuel flow or drag data to compute values for the FMS performance algorithms. The corrected airplane performance values can simply be looked up in the dynamic airplane performance data tables.

For example, FIG. 6 is a diagram representing a print-out of one example of a drag correction data table 50 that can be loaded as digital data into a non-transitory tangible computer-readable storage medium via a datalink or using an onboard network system. In data table 50, X is Mach number, Y is altitude (in feet) and Z is drag correction factor. A performance algorithm may be triggered to populate a dynamic airplane performance data table that contains data which is a function of drag.

When a set of dynamic airplane performance data tables are created or updated, their values are stored in a table format (having two or more dimensions) so that the values can be looked up and used in an efficient manner by the flight management system for performance computations such as trip prediction.

FIG. 7 is a diagram representing a print-out of one example of a look-up table 52 that is may be stored as digital data in a non-transitory tangible computer-readable storage medium and used by an FMS performance algorithm (e.g., Long Range Cruise) in a typical flight management system. In the exemplary look-up table 52 shown in FIG. 7, the input values are gross weight and the output values are long-range cruise Mach number. However, additional inputs, such as altitude and ambient air temperature, may be included in the look-up table. This table is defined using the baseline airplane performance data and is not modified when the airplane characteristics data, such as fuel flow, changes. Also this table cannot be updated within the flight management system.

In accordance with some embodiments of the improved system proposed herein, the flight management system can be configured (i.e., programmed) to populate the dynamic table with new values in response to a predetermined trigger point/event, such as certain crew actions or a determination that the deviation of a corrected airplane characteristic value from a current airplane characteristic value is equal to or greater than a specified threshold percentage. In accordance with other embodiments, the dynamic tables can be populated at regular intervals of time or before every flight.

In accordance with one embodiment, the system is configured to generate a dynamic airplane performance data table when the measured fuel flow rate deviates from the baseline fuel flow rate by more than a specified threshold. If the fuel flow value computed by the flight management computer using the fuel flow correction 44 (see FIG. 3) is different from the fuel flow actually used by the engines (so this is the real fuel consumption by the engines), then the flight management computer should populate the fuel flow data in the dynamic airplane performance data table.

Figures 8, 9:
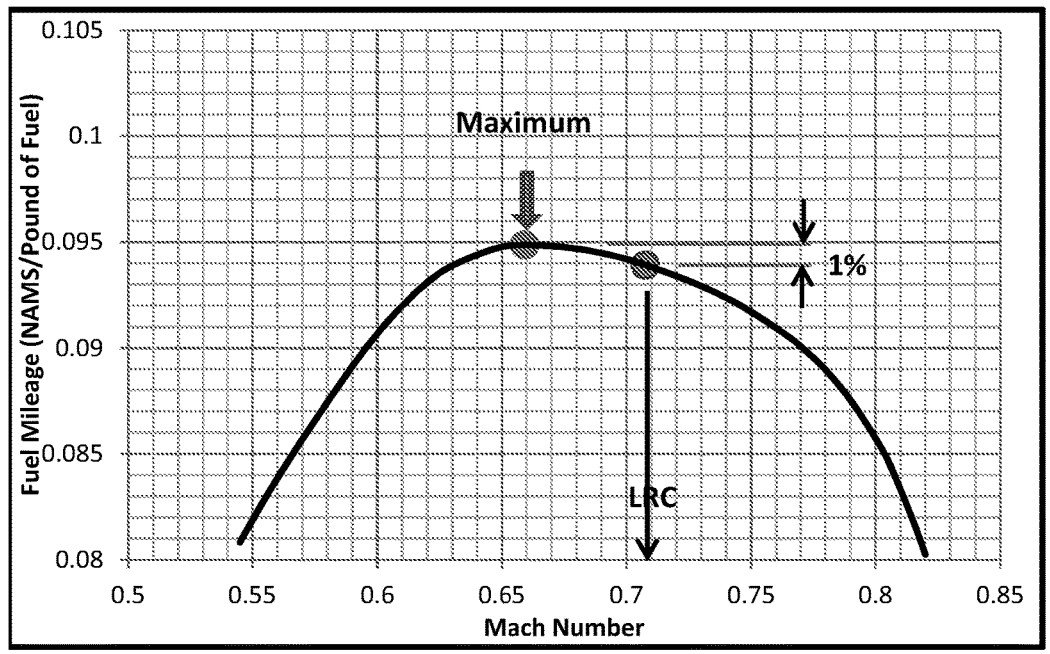
FIG. 8 is a graph illustrating the effect that selected long-range cruise Mach number has on an airplane's fuel mileage. The long-range cruise Mach number is on the horizontal axis; the fuel mileage (measured in terms of nautical miles flown in cruise per pound of fuel consumed) is on the vertical axis.
FIG. 9 is a diagram representing a print-out of one example of a dynamically generated data table that is may be stored as digital data in a non-transitory tangible computer-readable storage medium and used by an FMS performance algorithm (e.g., Long Range Cruise) in an enhanced flight management system.

FIG. 8 is a graph illustrating the effect that a selected long-range cruise Mach number has on an airplane's fuel mileage. The long-range cruise Mach number is on the horizontal axis; the fuel mileage (measured in terms of nautical miles flown in cruise per pound of fuel consumed) is on the vertical axis. The long-range cruise performance algorithm can use the corrected fuel flow values to compute long-range cruise Mach numbers for weights and altitudes of interest using known equations, for example, by computing fuel mileage using the ratio of true airspeed to fuel flow; determining the Mach number and associated fuel mileage where the fuel mileage is at a maximum, and then calculating the long-range cruise Mach number by multiplying the Mach number corresponding to maximum fuel mileage times a specified percentage (e.g., 99%). The computed long-range cruise Mach numbers can then be stored in a dynamic airplane performance data table with inputs weight and temperature. Accordingly, the flight management system does not have to constantly use the corrected fuel flow data to compute values for the long-range cruise Mach numbers. The corrected long-range cruise Mach numbers can simply be looked up in the dynamic airplane performance data tables.

FIG. 9 is a diagram representing a print-out of one example of a dynamic airplane performance data table 54 which the FMS long-range cruise performance algorithm can generate and utilize. It uses two inputs (gross weight and temperature deviation from standard day) instead of just one input (gross weight as shown in FIG. 7) The inputs to the dynamic airplane performance data table 54 can be defined within the flight management system or using other data tables such as the baseline performance database. Using this table is more computationally efficient than using a performance algorithm to compute long-range cruise Mach number over and over again.

A dynamic airplane performance data table can be in any format. For example, FIG. 10 is a diagram representing a print-out of one example of a dynamically generated airplane performance data table 56 that is may be stored as digital data in XML format in a non-transitory tangible computer-readable storage medium and used by an FMS performance algorithm (e.g., Long Range Cruise) in an enhanced flight management system.

Figure 11B:
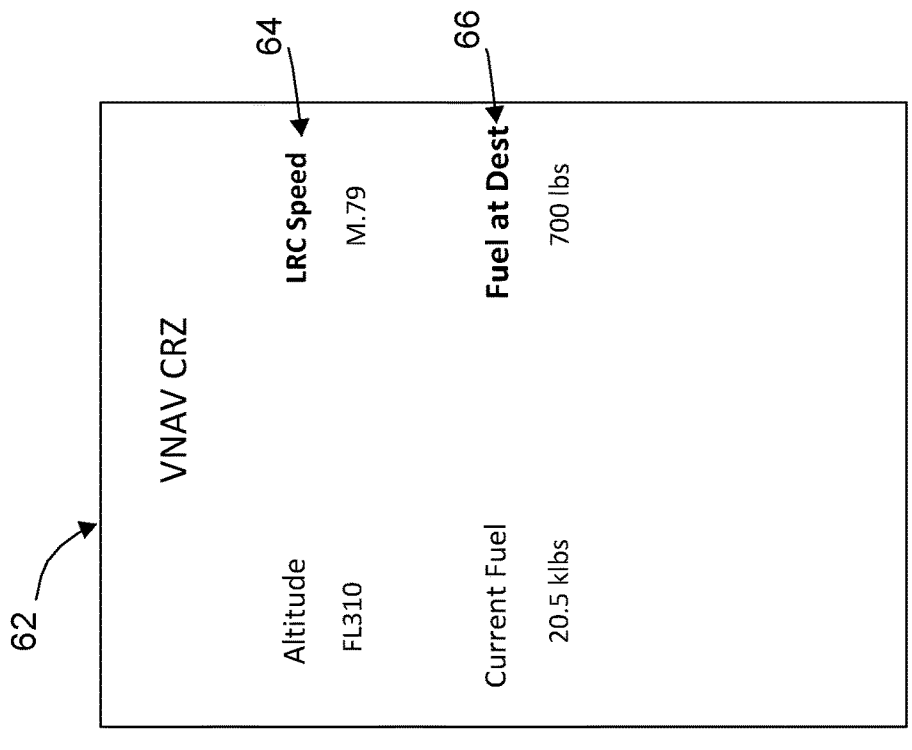
FIGS. 11A and 11B are diagrams representing successive screenshots from a CDU.
Figure 11A:
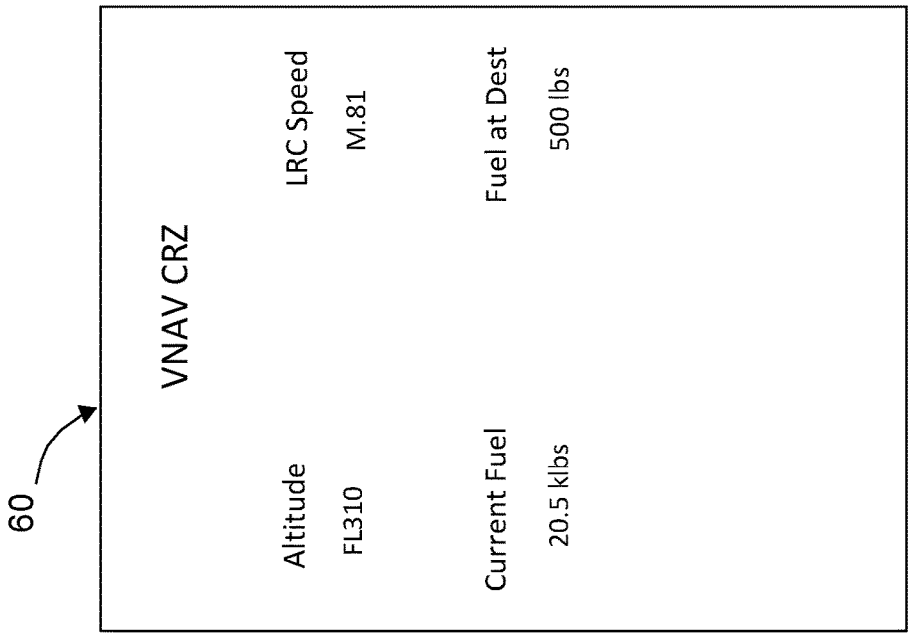

Furthermore, when the FMS performance algorithms use the dynamic airplane performance data tables instead of the baseline airplane performance data tables, this will be indicated to the pilot by various visual indications on the CDU pages or on the flight deck displays. For example, FIGS. 11A and 11B are diagrams representing successive screenshots 60 and 62 from a CDU. FIG. 11A shows a screenshot 60 of a CDU page that is displayed when the flight management system is using a baseline airplane performance data table, such as an aero/engine database. FIG. 11B shows a screenshot 62 of a changed CDU page that is displayed when the flight management system is using a dynamic airplane performance data table. FIGS. 11A and 11B show how the CDU page can be changed to reflect that the FMS performance algorithm is using the dynamic table instead of the baseline performance database. The change from not boldface "LRC Speed" and "Fuel at Dest" labels in FIG. 11A to boldface "LRC Speed" label 64 and boldface "Fuel at Dest" label 66 in FIG. 11B is intended to indicate a change in color (e.g., from black to red) that occurs when the flight management system is using the dynamic airplane performance data table instead of the baseline airplane performance data table.

Figure 12:
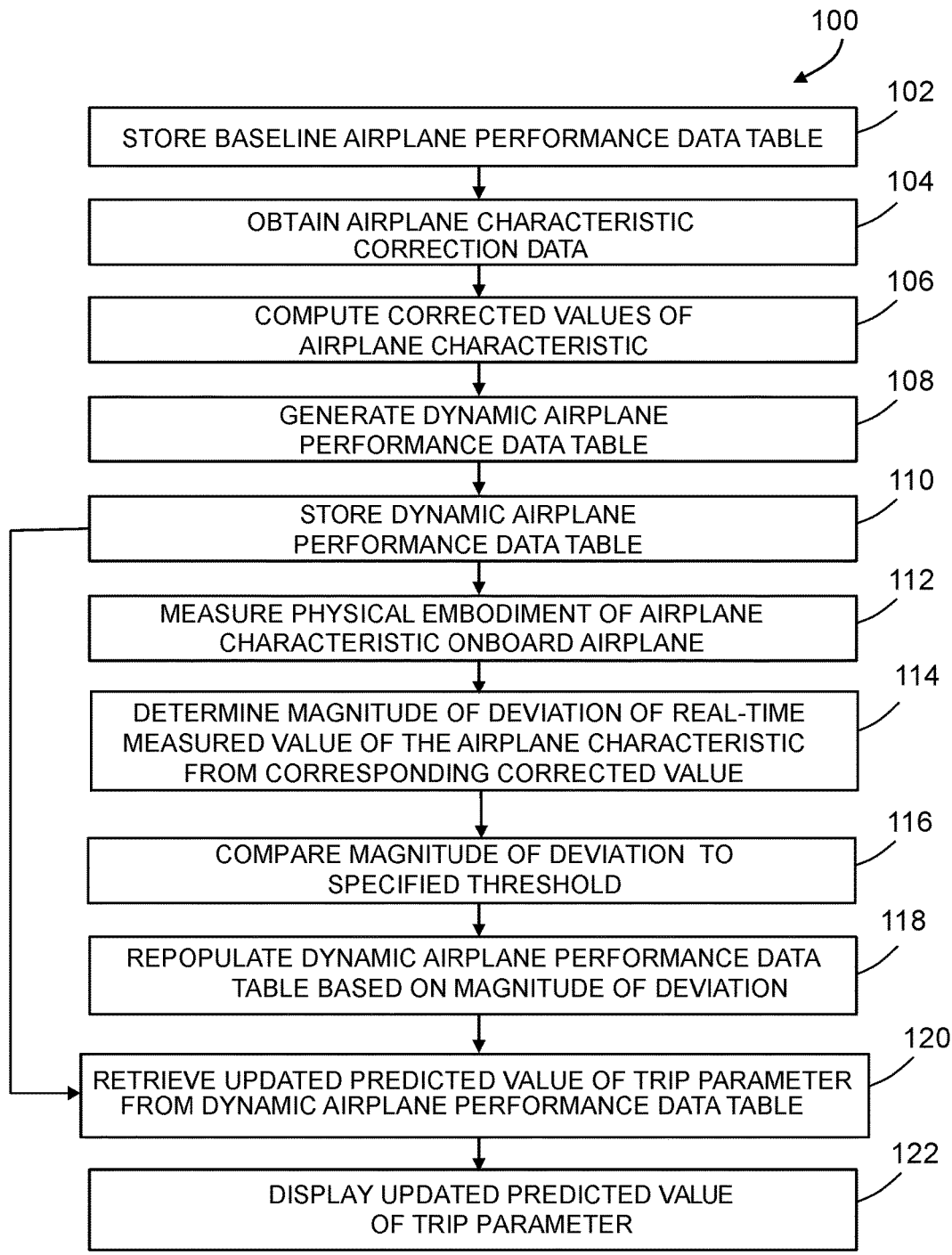
FIG. 12 is a flowchart listing steps of a method for displaying a predicted value of a trip parameter onboard an airplane in accordance with one embodiment.

FIG. 12 is a flowchart listing steps of a method 100 for displaying a predicted value of a trip parameter onboard an airplane in accordance with one embodiment. This method 100 comprises the following steps: storing a baseline airplane performance data table in a first non-transitory tangible computer-readable medium, the baseline airplane performance data table comprising a first lookup table having inputs which are values of flight parameters and having outputs which are predicted values of a trip parameter, which trip parameter values are functions of baseline values of an airplane characteristic and the values of the flight parameters (step 102); obtaining airplane characteristic correction data representing corrections to be applied to the baseline values of the airplane characteristic of the airplane (step 104); computing corrected values of the airplane characteristic by applying the corrections to the baseline values of the airplane characteristic of the airplane (step 106); generating a dynamic airplane performance data table comprising a second lookup table having inputs which are values of the flight parameters and having outputs which are updated predicted values of the trip parameter, which trip parameter values are functions of the corrected values of the airplane characteristic and the values of the flight parameters (step 108); storing the dynamic airplane performance data table in a second non-transitory tangible computer-readable medium (step 110); retrieving an updated predicted value of the trip parameter from the dynamic airplane performance data table during a current flight of the airplane (step 120); and displaying alphanumeric symbology representing the retrieved updated predicted value on a display unit in the flight deck during the current flight of the airplane (step 122).

After the dynamic airplane performance data table has been stored, the method may comprise the following additional steps: measuring a physical embodiment of the airplane characteristic onboard the airplane to produce a real-time measured value of the airplane characteristic (step 112); determining a magnitude of a deviation of the real-time measured value of the airplane characteristic from a corresponding one of the corrected values of the airplane characteristic (step 114); comparing the magnitude of the deviation to a specified threshold (step 116); repopulating the dynamic airplane performance data table based on the magnitude of the deviation in response to the magnitude of the deviation exceeding the specified threshold (step 118); retrieving an updated predicted value of the trip parameter from the dynamic airplane performance data table during a current flight of the airplane (step 120); and displaying alphanumeric symbology representing the retrieved updated predicted value on a display unit in the flight deck during the current flight of the airplane (step 122).

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for displaying a predicted value of a trip parameter onboard an airplane having a flight management computer during flight, comprising:

(a) storing a baseline airplane performance database in a first non-transitory tangible computer-readable storage medium, the baseline airplane performance database comprising aerodynamic data for an aerodynamic model of the airplane, propulsion data for an engine performance model and a thrust rating model of engines of the airplane, and a first lookup table having inputs which are values of flight parameters and having outputs which are predicted values of a trip parameter, which trip parameter values are functions of baseline values of an aerodynamic or a propulsion characteristic of the airplane extracted from the aerodynamic and propulsion data and the values of the flight parameters;

(b) measuring a physical embodiment of the aerodynamic or propulsion characteristic onboard the airplane to produce a real-time measured value of the aerodynamic or propulsion characteristic;

(c) calculating a magnitude of a deviation of the real-time measured value of the aerodynamic or propulsion characteristic from a corresponding baseline value of the aerodynamic or propulsion characteristic;

(d) determining whether the magnitude of the deviation is greater than a specified threshold percentage;

(e) populating a dynamic airplane performance data table in response to a determination in step (d) that the magnitude of the deviation is greater than the specified threshold percentage, wherein the dynamic airplane performance data table is a second lookup table having inputs which are values of the flight parameters and having outputs which are updated predicted values of the trip parameter, which updated predicted trip parameter values are functions of the real-time measured value of the aerodynamic or propulsion characteristic and the values of the flight parameters;

(f) storing the dynamic airplane performance data table in a second non-transitory tangible computer-readable storage medium;

(g) retrieving an updated predicted value of the trip parameter from the dynamic airplane performance data table; and (h) controlling a display unit in the flight deck to display alphanumeric symbology representing the retrieved updated predicted value, wherein at least operations (c) through (h) are performed automatically by the flight management computer during a current flight of the airplane.

2. The method as recited in claim 1, wherein the first non-transitory tangible computer-readable storage medium and second non-transitory tangible computer-readable storage medium are inside the flight management computer.

3. The method as recited in claim 1, wherein the first non-transitory tangible computer-readable storage medium is inside the flight management computer, and the second non-transitory tangible computer-readable storage medium is onboard the airplane but outside the flight management computer.

4. The method as recited in claim 1, wherein the real-time measured value of the aerodynamic or propulsion airplane characteristic is a real-time measured drag value.

5. The method as recited in claim 1, wherein the real-time measured value of the aerodynamic or propulsion airplane characteristic is a real-time measured fuel flow value.

6. The method as recited in claim 1, wherein the updated predicted values of the trip parameter in the dynamic airplane performance data table are a function of at least first and second flight parameter inputs, the first flight parameter inputs being values of air temperature, the second flight parameter inputs being values of gross weight, and the updated predicted values of the trip parameter being values of long-range cruise Mach number.

7. A method for displaying a predicted value of a trip parameter onboard an airplane having a flight management computer during flight, comprising:
  (a) storing values of a propulsion characteristic in a non-transitory tangible computer-readable medium;
  (b) storing a dynamic airplane performance data table in the non-transitory tangible computer-readable storage medium, the dynamic airplane performance data table comprising a lookup table having inputs which are values of the flight parameters and having outputs which are updated predicted values of the trip parameter, which updated predicted trip parameter values are functions of the values of the propulsion characteristic and the values of the flight parameters;
  (c) measuring a physical embodiment of the propulsion characteristic onboard the airplane to produce a real-time measured value of the propulsion characteristic;
  (d) determining a magnitude of a deviation of the real-time measured value of the propulsion characteristic from a corresponding one of the values of the propulsion characteristic;
  (e) comparing the magnitude of the deviation to a specified threshold;
  (f) repopulating the dynamic airplane performance data table based on the magnitude of the deviation in response to the magnitude of the deviation exceeding the specified threshold;
  (g) retrieving an updated predicted value of the trip parameter from the repopulated dynamic airplane performance data table; and
  (h) controlling a display unit in the flight deck to display alphanumeric symbology representing the retrieved updated predicted value,
  wherein at least operations (d) through (h) are performed automatically by the flight management computer during a current flight of the airplane.

8. The method as recited in claim 7, wherein the non-transitory tangible computer-readable storage medium is inside the flight management computer.

9. The method as recited in claim 7, wherein the non-transitory tangible computer-readable storage medium is onboard the airplane but outside the flight management computer.

10. The method as recited in claim 7, wherein the propulsion characteristic is fuel flow.

11. The method as recited in claim 7, wherein the updated predicted values of the trip parameter in the dynamic airplane performance data table are a function of at least first and second flight parameter inputs, the first flight parameter inputs being values of air temperature, the second flight parameter inputs being values of gross weight, and the updated predicted values of the trip parameter being values of long-range cruise Mach number.

12. A system for displaying a predicted value of a trip parameter onboard an airplane, comprising a first non-transitory tangible computer-readable storage medium, a second non-transitory tangible computer-readable storage medium, a display unit and a computer system configured to perform the following operations:
  (a) storing a baseline airplane performance database in the first non-transitory tangible computer-readable storage medium, the baseline airplane performance database comprising aerodynamic data for an aerodynamic model of the airplane, propulsion data for an engine performance model and a thrust rating model of engines of the airplane, and a first lookup table having inputs which are values of flight parameters and having outputs which are predicted values of a trip parameter, which trip parameter values are functions of baseline values of aerodynamic and propulsion characteristics of the airplane extracted from the aerodynamic and propulsion data and the values of the flight parameters;
  (b) measuring a physical embodiment of the aerodynamic or propulsion characteristic onboard the airplane to produce a real-time measured value of the aerodynamic or propulsion characteristic;
  (c) calculating a magnitude of a deviation of the real-time measured value of the aerodynamic or propulsion characteristic from a corresponding baseline value of the aerodynamic or propulsion characteristic;
  (d) determining whether the magnitude of the deviation is greater than a specified threshold percentage;
  (e) populating a dynamic airplane performance data table in response to a determination in step (d) that the magnitude of the deviation is greater than the specified threshold percentage, wherein the dynamic airplane performance data table is a second lookup table having inputs which are values of the flight parameters and having outputs which are updated predicted values of the trip parameter, which updated predicted trip parameter values are functions of the real-time measured value of the aerodynamic or propulsion characteristic and the values of the flight parameters;
  (f) storing the dynamic airplane performance data table in the second non-transitory tangible computer-readable storage medium;
  (g) retrieving an updated predicted value of the trip parameter from the dynamic airplane performance data table; and
  (h) controlling said display unit to display alphanumeric symbology representing the retrieved updated predicted value,
  wherein operations (b) through (h) are performed automatically during a current flight of the airplane.

13. The system as recited in claim 12, wherein the real-time measured value of the aerodynamic or propulsion airplane characteristic is a real-time measured drag value.

14. The system as recited in claim 12, wherein the real-time measured value of the aerodynamic or propulsion airplane characteristic is a real-time measured fuel flow value.

15. The system as recited in claim 12, wherein the updated predicted values of the trip parameter in the dynamic airplane performance data table are a function of at least first and second flight parameter inputs, the first flight parameter inputs being values of air temperature, the second flight parameter inputs being values of gross weight, and the updated predicted values of the trip parameter being values of long-range cruise Mach number.

16. The system as recited in claim 12, wherein the aerodynamic or propulsion characteristic is fuel flow.

* * * * *